United States Patent
Zhou (10) Patent No.: US 8,560,408 B2
(45) Date of Patent: Oct. 15, 2013

(54) MECHANISM FOR CONTROLLING CHARGING IN CASE OF CHARGING CLIENT RELOCATION

(75) Inventor: Wei Hua Zhou, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 646 days.

(21) Appl. No.: 12/867,779

(22) PCT Filed: Apr. 24, 2008

(86) PCT No.: PCT/EP2008/055010
§ 371 (c)(1),
(2), (4) Date: Aug. 16, 2010

(87) PCT Pub. No.: WO2009/129856
PCT Pub. Date: Oct. 29, 2009

(65) Prior Publication Data
US 2010/0332361 A1    Dec. 30, 2010

(51) Int. Cl.
*H04M 11/00* (2006.01)
*H04W 4/00* (2009.01)
*H04W 84/02* (2009.01)
*H04W 88/02* (2009.01)
*H04W 4/24* (2009.01)

(52) U.S. Cl.
CPC .............. *H04W 84/02* (2013.01); *H04W 88/02* (2013.01); *H04W 4/24* (2013.01)
USPC ............. 705/30; 455/403; 455/405; 455/406; 455/408; 455/409; 705/14.69; 370/328; 370/331; 370/335; 370/338; 370/342

(58) Field of Classification Search
CPC ....... H04W 84/02; H04W 88/02; H04W 4/24; H04W 2215/32; H04W 80/04
USPC ........ 455/403–408, 41.2, 436; 705/14.69, 30; 370/331, 342, 328, 335, 338
See application file for complete search history.

(56) References Cited

U.S. PATENT DOCUMENTS

| | | | |
|---|---|---|---|
| 6,836,653 B1 * | 12/2004 | Kang | 455/408 |
| 6,973,309 B1 * | 12/2005 | Rygula et al. | 455/436 |
| 7,171,189 B2 * | 1/2007 | Bianconi et al. | 455/408 |
| 7,215,958 B2 * | 5/2007 | Kovacs et al. | 455/436 |
| 7,525,940 B2 * | 4/2009 | Trossen et al. | 370/331 |
| 7,869,787 B2 * | 1/2011 | Koskinen et al. | 455/406 |

(Continued)

OTHER PUBLICATIONS

3rd Generation Partnership Project; Technical Specification Group Services and System Aspects; Policy and charging control architecture (Release 7), 3GPP TS 23.203, V7.1.0, Technical Specification, Dec. 2006, pp. 1-70.

*Primary Examiner* — Matthew Gart
*Assistant Examiner* — Olusegun Goyea
(74) *Attorney, Agent, or Firm* — Squire Sanders (US) LLP (57) ABSTRACT

There is proposed a mechanism for charging control and a charging client relocation. When it is determined that a relocation of a charging related functionality for a communication connection from a previous charging client node to a new charging client node is executed, the new charging client node requests quota information used in a charging procedure for the communication connection from a charging server node. A charging agent is informed by the new charging client node about the relocation to the new charging client node after predetermined information is received from the previous charging client node and the quota information is received from the charging server.

11 Claims, 9 Drawing Sheets

(56) References Cited

U.S. PATENT DOCUMENTS

| | | | |
|---|---|---|---|
| 7,958,238 B1* | 6/2011 | Batz et al. | 709/225 |
| 8,031,671 B2* | 10/2011 | Harper et al. | 370/331 |
| 8,140,112 B2* | 3/2012 | Shaheen et al. | 455/552.1 |
| 8,150,317 B2* | 4/2012 | Suh et al. | 455/41.2 |
| 8,249,025 B2* | 8/2012 | Harper et al. | 370/331 |
| 2003/0031160 A1* | 2/2003 | Gibson Ang et al. | 370/349 |
| 2004/0106393 A1* | 6/2004 | Chowdhury et al. | 455/406 |
| 2004/0156340 A1* | 8/2004 | Madour | 370/335 |
| 2005/0075099 A1* | 4/2005 | Guyot | 455/414.1 |
| 2005/0181758 A1* | 8/2005 | Ansamaa | 455/406 |
| 2007/0179796 A1* | 8/2007 | Taglienti et al. | 705/1 |
| 2008/0095138 A1* | 4/2008 | Wu et al. | 370/342 |
| 2009/0116628 A1* | 5/2009 | Ropolyi | 379/114.22 |
| 2009/0264096 A1* | 10/2009 | Cai et al. | 455/406 |
| 2011/0243126 A1* | 10/2011 | Witzel et al. | 370/352 |
| 2012/0157041 A1* | 6/2012 | Cai et al. | 455/406 |

* cited by examiner

MECHANISM FOR CONTROLLING CHARGING IN CASE OF CHARGING CLIENT RELOCATION

BACKGROUND OF THE INVENTION

1. Field of the Invention

The present invention relates to charging control for a communication connection in case of a relocation of a charging functionality. In particular, the present invention relates to a mechanism for charging control, such as online charging and/or pre-paid based charging, in a communication network where at least a part of charging functions is affected by mobility of a mobile station and the change of network elements caused thereby.

2. Related Prior Art

In the last years, an increasing extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMax), took place all over the world. Various organizations, such as the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards for telecommunication network and access environments.

In order to gain access to network and service resources, it is necessary that a subscriber performs an authentication and authorization procedure, also known as Authentication-Authorization-Accounting (AAA). For an AAA signaling, an AAA protocol may be used, such as RADIUS (Remote Authentication Dial-In User Service) or Diameter, between concerned network elements or nodes, such as between a local network AAA (client) node (responsible for service authentication if this is provided in the local network) and a home network that holds the subscription data and/or a home AAA server.

Authentication refers to the confirmation that the subscriber who is requesting services is a valid user of the network services requested. For this purpose, an identity and credentials are used. Authorization describes the grant of services to the requesting subscriber on the basis of the service request and the authentication result. Accounting, on the other hand, is related to the tracking of the consumption of resources and is used for management, billing, charging and the like. With regard to charging, currently two modes are normally used, i.e. online charging and offline charging.

Figure 9:
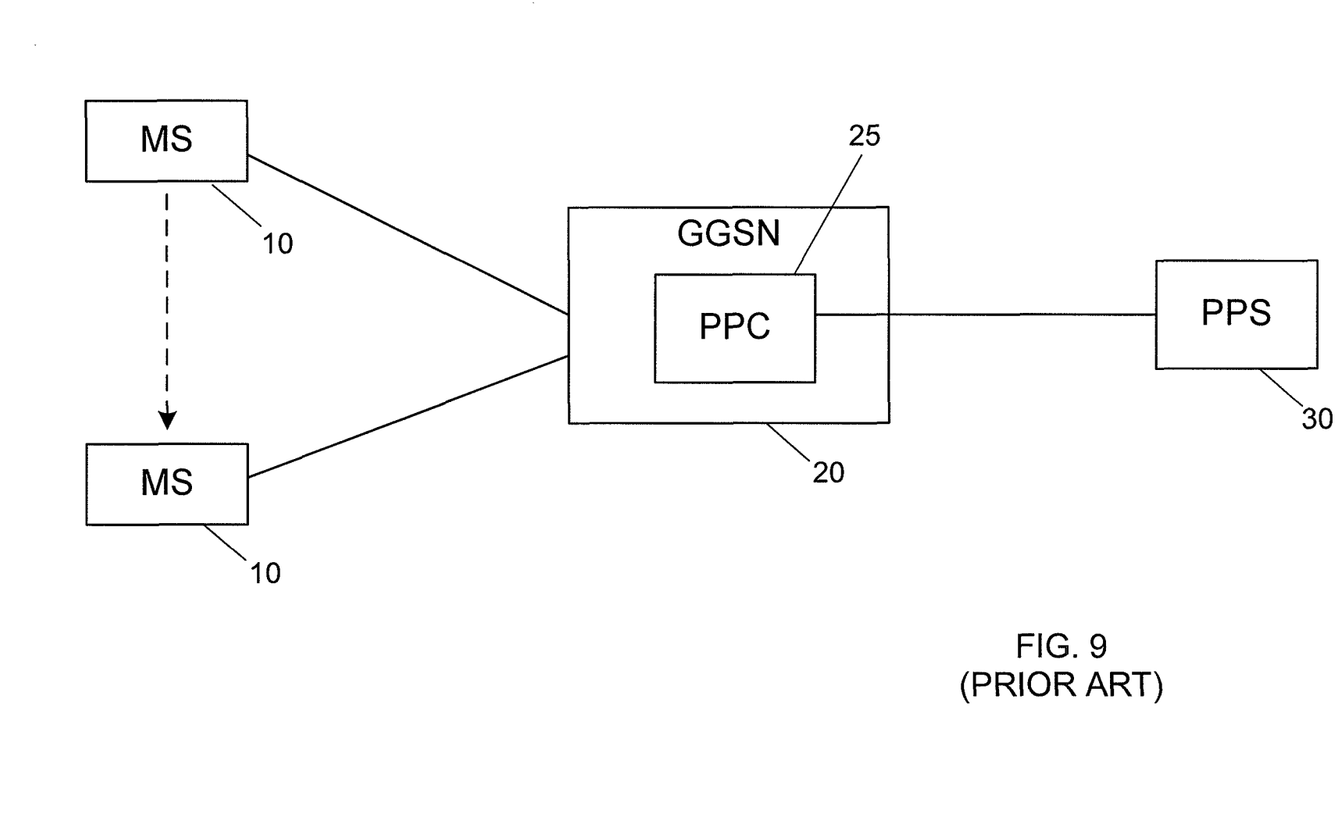
FIG. 9 shows a shows a block circuit diagram illustrating an example of an online charging architecture according to the prior art and FIG. 10 shows a signaling diagram of a charging control mechanism and a charging client relocation procedure according to another example of an embodiment of the invention.

As an example for a charging scheme to be used in a communication network, a Diameter Credit Control Application (DCCA) is designed by IETF and then enriched by 3GPP to be used as the control protocol for online charging. DCCA is based on client (such as a charging or prepaid client (PPC))/server (charging or prepaid server (PPS)) mode. In FIG. 9, a known example of a configuration of a corresponding charging system and network elements involved thereby is shown.

In FIG. 9, reference sign 10 denotes a mobile station (MS) which establishes a communication connection for which the subscriber is to be charged. Reference sign 20 denotes a core network element, such as a General Packet Radio Service Gateway Support Node (GGSN), which comprises a PCC portion 25 and to which the MS 10 is connected. Reference sign 30 denotes a PPS (located, for example, in a Home AAA (HAAA) server of the MS 10) which communicates with the PPC portion 25 in the GGSN 20.

According to the basic configuration of DCCA, the PPC is designed to be co-located with anchor point, such as the GGSN 20 in FIG. 9. Thus, when a subscriber's MS 10 moves or is switched to another network access within the network, the anchor point, such as GGSN 20, does not change. In other words, the PPC is not effected by the mobility of the MS 10 and is therefore not changed. Hence, there is no need to consider any mobility issue with regard to the PPC and its location.

However, in so-called flat network hierarchies where the number of network elements involved in a communication connection becomes less, functionalities located in elements of a higher hierarchical order in other networks are moved to network elements of a lower hierarchical order. For example, specific (online) charging functionalities of a PPC may be moved to elements of the access network level, such as to an Access Service Network Gateway (ASN GW) in case of a WiMAX based system.

This means that such functionalities may not be remained in an anchor point in case the MS 10 is moving. Therefore, it is necessary to provide a possibility to relocate the PPC function from one ASN GW/PPC to another ASN GW/PPC. In this case PPC shall be relocated, and charging continuity shall also be guaranteed to support the continuity of subscriber's session. However, this issue is not considered in the original DCCA application.

There have been proposed some approaches to deal with this issue of providing a relocation possibility for the charging client functionality (or part thereof) in case the charging client functionality is located in a network elements affected by the mobility of the MS 10 (i.e. changed, for example, due to a handover from one ASN GW to another ASN GW in a WiMax system.

However, in the proposed mechanisms there may be the following situation. That is, for example, in case of a handover resulting also in relocation of the PPC, a charging agent, such as a prepaid agent (PPA), uses existing quotas (i.e. related to the former or previous PPC). A request for new quotas, directed, for example, to a PPS, is triggered by the PPA when it becomes aware of the PPC relocation completion. However, in such a case, the time necessary for retrieving the new quotas may become too long so that the available (old) quotas may be consumed in the meantime. This may result in a communication connection interruption and the loss of data transmitted via the communication connection.

SUMMARY OF THE INVENTION

Thus, it is an object of the invention to provide an improved mechanism for charging control where in case of a charging client relocation the communication connection is not interrupted and no data is lost.

This object is achieved by the measures defined in the attached claims.

In particular, according to one aspect of the proposed solution, there is provided, for example, an apparatus comprising a determiner configured to determine a relocation of a charging related functionality for a communication connection from a previous charging client node to a new charging client node, a requester configured to request, from a charging server node, quota information used in a charging procedure for the communication connection, for the new charging client node, a receiver configured to receive the quota information, and an informer configured to inform a charging agent about the relocation to the new charging client node after predetermined information is received from the previous charging client node and the quota information is received by the receiver.

Furthermore, according to one aspect of the proposed solution, there is provided, for example, a method comprising determining a relocation of a charging related functionality for a communication connection from a previous charging client node to a new charging client node, requesting, from a charging server node, quota information used in a charging procedure for the communication connection, for the new charging client node, and informing a charging agent about the relocation to the new charging client node after predetermined information is received from the previous charging client node and the quota information is received.

According to further refinements, the proposed solution according to these aspects may comprise one or more of the following features:

the predetermined information from the previous charging client node may comprise at least one of mobile station context data and charging client context data;
an acknowledgment message for a receipt of the predetermined information may be transmitted to the previous charging client node directly after receipt thereof or after receipt of the quota information;
the relocation to the new charging client node may be rejected in case no quota information is received;
a relocation complete indication message may be transmitted to the previous charging client node, wherein the relocation complete indication message may comprises at least one of an information indicating a support of a specific charging mode and an information indicating an inhibition of a quota information transmission from the previous charging client node side;
data may be sent for updating charging client context data in the charging agent;
a session with the charging server node may be set up on the basis of an authentication-authorization-accounting protocol;
quota information may be transmitted to the charging agent based on the quota information received by the receiver with the information on the relocation or separately.

In addition, according to one aspect of the proposed solution, there is provided, for example, an apparatus comprising a receiver configured to receive information, related to a relocation of a charging related functionality for a communication connection from a previous charging client node to a new charging client node, from the new charging client node, wherein the information comprises charging client context data and quota information for the new charging client node, a processor configured to process the received information and quota information, a memory configured to store information, and an updater configured to update quota information and charging client context data stored in the memory.

Furthermore, according to one aspect of the proposed solution, there is provided, for example, a method comprising receiving information, related to a relocation of a charging related functionality for a communication connection from a previous charging client node to a new charging client node, from the new charging client node, wherein the information comprises charging client context data and quota information for the new charging client node, processing the received information and quota information, storing information, and updating quota information and charging client context data stored.

According to further refinements, the proposed solution according to these aspects may comprise one or more of the following features:

a communication with the new charging client node may be executed on the basis of the information stored in the memory for executing a quota update;
a charging session with the previous charging client node may be terminated;
the quota information may be combined with the information related to the relocation of a charging related functionality for a communication connection from the previous charging client node to the new charging client node.

Moreover, according to one aspect of the proposed solution, there is provided, for example, a computer program product for a computer, comprising software code portions for performing the steps of any of methods defined above when said product is run on the computer. The computer program product may comprise a computer-readable medium on which said software code portions are stored, wherein the computer program product may be directly loadable into the internal memory of the computer.

By virtue of the proposed solutions, it is possible to provide a charging mechanism where new quotas are available to a charging agent (such as the PPA) when the charging client relocation is notified to the agent (for example together with Authenticator/PPC context update). Therefore, there is no time gap between the PPC update and the availability of new quotas. Thus, the communication connection is not interrupted and no packets will be dropped. Furthermore, the invention is easy to implement. For example, it is only necessary to adapt the charging client functionality and the charging agent functionality, while any changes of the element related to the charging server (such as the PPS) is not necessary since the relocation of the charging client functionality is transparent for the charging server. Moreover, the proposed solutions are applicable to different AAA systems and protocols; for example, AAA protocols according to RADIUS and/or Diameter may be used for the proposed solutions.

The above and still further objects, features and advantages of the invention will become more apparent upon referring to the description and the accompanying drawings.

DESCRIPTION OF PREFERRED EMBODIMENTS

In the following, examples and embodiments of the present invention are described with reference to the drawings. For illustrating the present invention, the examples are based on a WiMAX system according to IEEE and WiMAX Fourm standards. However, it is to be noted that embodiments of the present invention are not limited to an application in such a system or environment but are also applicable in other network systems, connection types and the like, for example in networks according to 3GPP specifications, in Wireless Local Area Networks (WLAN) or the like.

A basic system architecture of a communication network may comprise a commonly known architecture of a wired or wireless access network subsystem. Such an architecture comprises one or more access network control units, radio access network elements, access service network gateways or base transceiver stations, with which a mobile station or terminal device as a subscriber's communication unit is capable of communicating via one or more channels for transmitting several types of data. The general functions and interconnections of these elements are known to those skilled in the art and described in corresponding specifications so that a detailed description thereof is omitted herein. However, it is to be noted that there are provided several additional network elements and signaling links used for a communication connection or a call between end terminals and/or servers.

Furthermore, the network elements and their functions described herein may be implemented by software, e.g. by a computer program product for a computer, or by hardware. In any case, for executing their respective functions, correspondingly used devices, such as charging client nodes, charging server nodes, charging agents and the like, comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Figure 1:
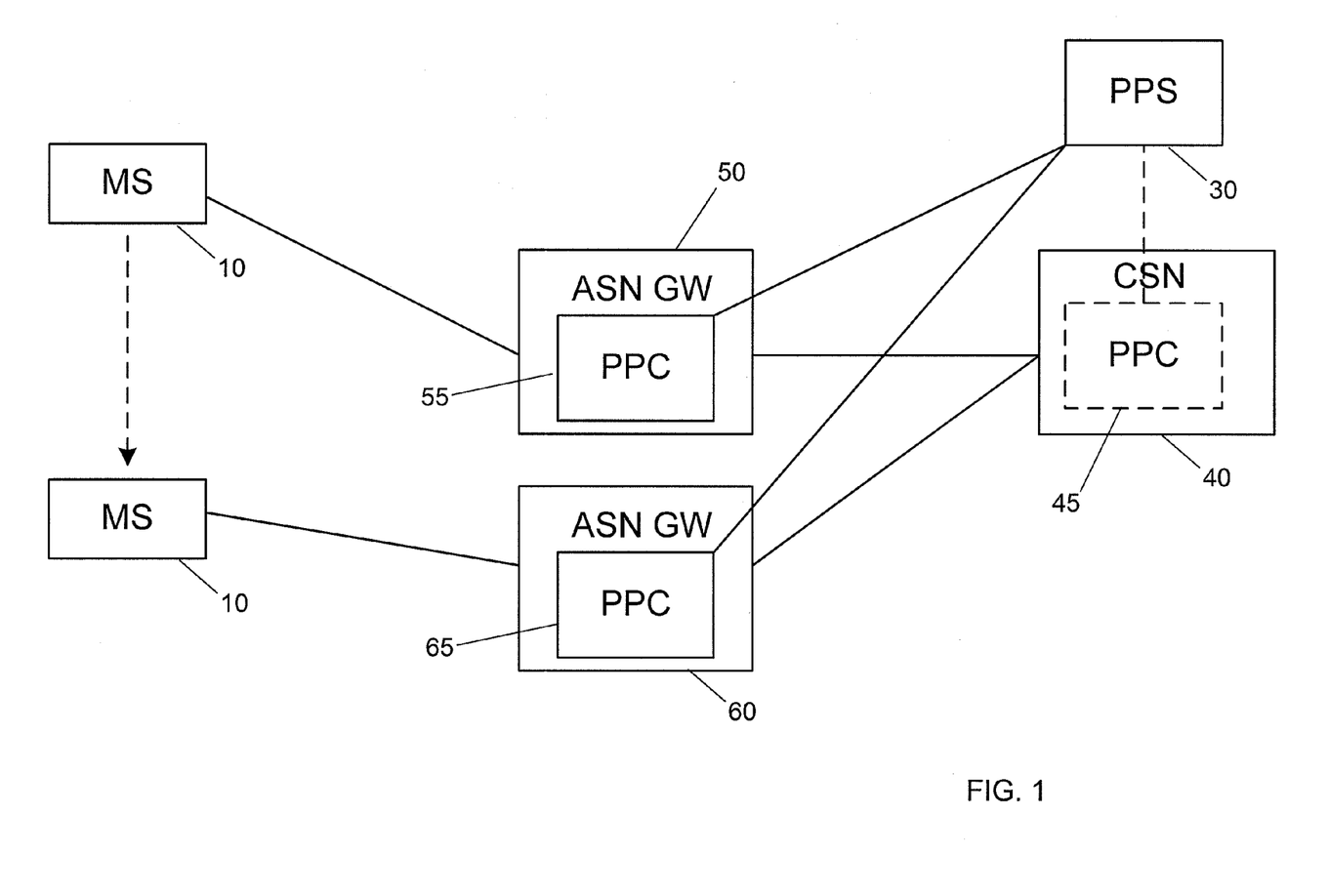
FIG. 1 shows a block circuit diagram illustrating an example of an online charging architecture in a communication network where an embodiment of the application is applicable.

FIG. 1 shows a simplified diagram of an architecture of a communication network to which the present invention is applicable. In FIG. 1, an example based on WiMAX specification is presented. However, it is to be noted that also other network systems can use the principles defined below, for example a 3GPP based network, a WLAN and the like, or network systems developed in the future and having similar basic functionalities. The respective network elements comprised by such network systems and in particular those being involved in the authentication, authorization and accounting procedure are generally known by those skilled in the art so that a detailed description thereof is omitted herein for the sake of simplicity. Furthermore, it is to be noted that the functional architecture can be designed into various hardware configurations rather than fixed configurations.

According to FIG. 1, network elements and functions useful for understanding the invention are shown. Reference sign 10 denotes a mobile station (MS) representing one example of a subscriber station communication in the network for which AAA is to be executed and whose communication connections are to be charged.

Reference signs 50 and 60 denote respective Access Service Network Gateways (ASN GW) being part of an ASN of the WiMax communication system together with corresponding base stations (not shown). The ASN-GWs 50 and 60 are placed at the edge of the ASN and provide a link to a Connectivity Service Network (CSN) 40. The purpose of the ASN-GW is to assist mobility and security in the control plane and to handle IP forwarding.

The ASN GW 50 and 60 comprise charging client functionalities, such as so-called prepaid clients (PPC) 55 and 65, respectively. The PPCs 55 and 65 communicate with a charging server, such as a prepaid server 30, which may be located in a Home AAA server node (not shown) of the MS 10. The charging server 30, such as the PPS 30, maintains charging information for the MS 10, for example, prepaid information. The charging clients 55 and 65, respectively, may handle charging accounting requests and responses, such as prepaid requests and responses.

Whenever an authorization request is made by the charging client (originated by the MS 10), the charging server 30 allocates a fraction of the subscriber's balance to a quota. When the allocated quotas are consumed to reach a threshold, a further authorization request is sent to the charging server to request new quotas.

Reference sign 40 denotes the CSN. The CSN 40 may also comprise a charging client functionality, such as a PPC 45, which may also communicate with the charging server (PPS) 30. The ASN GWs 50 and 60 are connected to the CSN 40 for communication connection handling.

When the MS 10 is switched from one ASN GW 50 to another ASN GW 60, for example due to a movement of the MS 10 (as indicated by an arrow in FIG. 1) to the domain of the other ASN GW 60 or due to quality reasons (traffic load reasons or the like), also the responsibility of the respective charging clients for the communication connection of the MS 10 is changed from the PPC 55 to the PPC 65. In other words, a relocation of the charging client is also to be effected. As described above, when the communication network in which the MS 10 is located has a flat structure, at least some of the online charging functionalities are moved to access point, such as ASN GW in WiMAX. In this case, the PPC is to be relocated, while charging continuity has to be guaranteed so as to support the continuity of subscriber's session.

Figure 2:
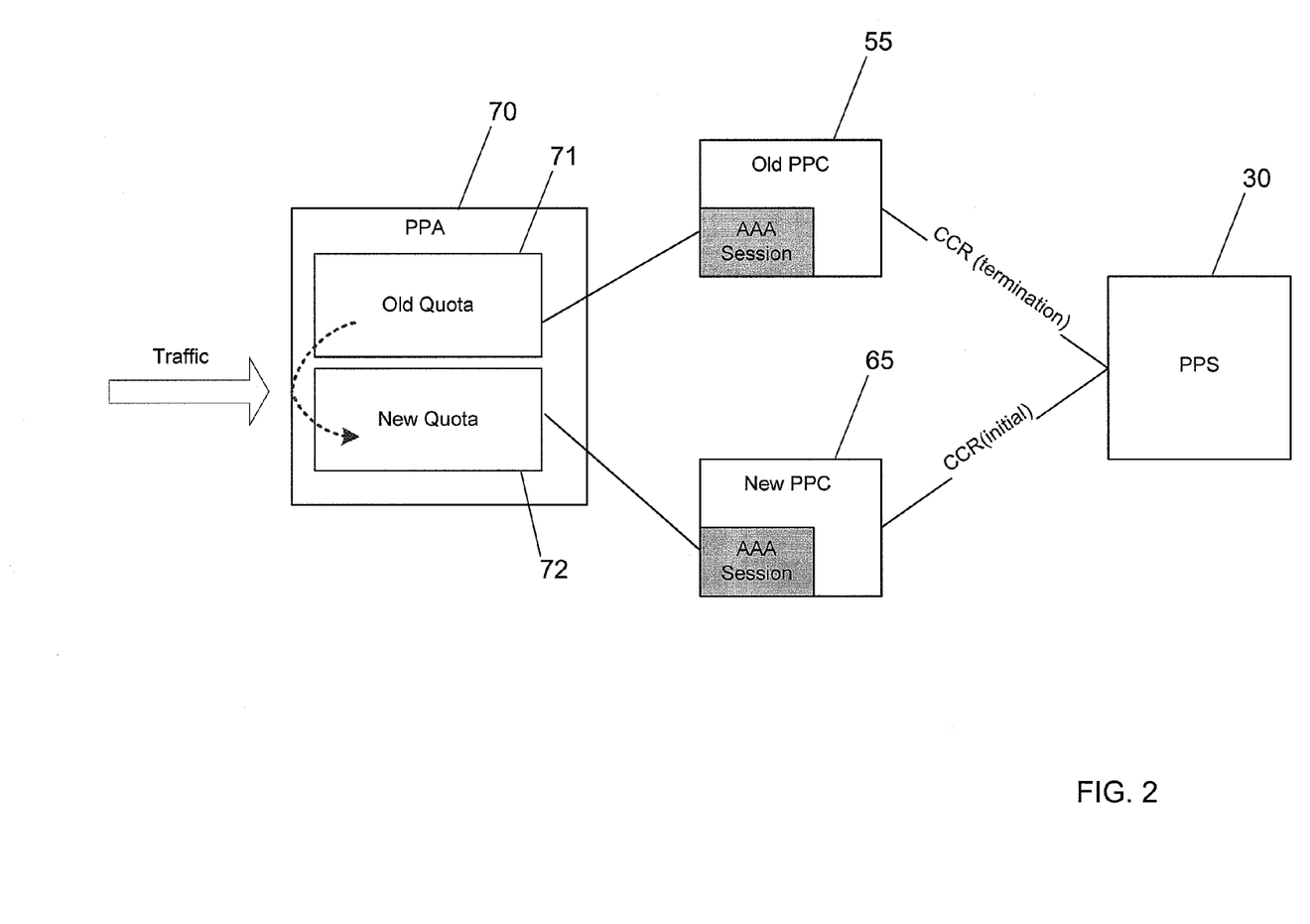
FIG. 2 shows a diagram illustrating a situation of a relocation of a charging client functionality in a communication network where an embodiment of the application is applicable.

In FIG. 2, a diagram is shown illustrating a situation of a relocation of a charging client functionality in a communication network where an embodiment of the application is applicable. FIG. 2 shows elements 30, 55 and 65 of FIG. 1 so that an explanation thereof is omitted. During a corresponding AAA session for a communication connection carrying traffic of the MS 10, the PPC 55 (also referred to as old or previous PPC) has an AAA session with the PPS 30 wherein, when the relocation is to be done, a Credit Control Request (CCR) for terminating the session is transmitted. On the other hand, when the relocation is executed, the PPC 65 (also referred to as new PPC) establishes an AAA session with the PPS 30 wherein a Credit Control Request (CCR) for initializing the session is transmitted.

In addition to these elements 30, 55 and 65, reference sign 70 denotes a charging agent, such as a prepaid agent PPA. The PPA 70 communicates with the charging clients 55 and 65 and stores/updates quota information for the MS 10.

For example, in a WiMAX based system, for the PPA the PPS is assumed to be collocated with the HAAA in the Home CSN (HCSN). The PPC may be located at the ASN and/or the HCSN or Visited CSN (VCSN) in a Home Agent (HA). The PPC may perform metering when it is in the bearer path. However, in case the PPC is not on the bearer path, the PPA is used for metering the flows on behalf of the PPC and is located in the ASN at the bearer path (i.e., an anchor Data Plane Function). The PPA may communicate with the PPC over a specific interface, such as R4 in WiMAX. The PPA is also responsible for the quota management, and PPC may act as a proxy between the PPA and the PPS. The PPC maintains the parameters used to communicate with the PPS over a specific interface, such as an R3 interface. These parameters might be transferred from old PPC to new PPC when authenticator relocation occurs.

According to one example of an embodiment of the invention, which is based on an online charging architecture defined in WiMAX specification, online charging, which may be based on a Diameter protocol, has the following key points:

1. In a PPC relocation scenario, the charging agent (PPA) 70 has to maintain old quotas 71 and new quotas 72 separately. Old quotas means quotas allocated through a previous PPC (in the scenario described in FIGS. 1 and 2, this is the PPC 55 located in the ASN GW 50), and new quotas means quotas allocated through a new PPC (in the scenario described in FIGS. 1 and 2, this is the PPC 65 located in the ASN GW 60);
2. Before new quotas are available and activated for the charging agent 70, old quotas 71 are to be continually used for online charging so as to guarantee the continuity of subscriber's session;
3. After new quotas 72 are available and active, the charging agent reports the information about consumed old quotas to the charging server 30 through, and return the left (old) quotas to charging server 30 at the same time (in case such quotas are applicable).

In the following, a charging control mechanism and a charging client relocation procedure according to one example of an embodiment of the invention are described with reference to the signaling diagram of FIG. 3.

When the MS 10 of FIG. 1 is moved, for example, from the domain of the ASN GW 50 to the domain of the ASN GW 60, a relocation procedure is executed. Thus, in a step (1), an authenticator relocation for an authenticator function of the ASN GWs from the previous ASN GW 50 having the PPC 55 to the new ASN GW 60 having the PPC 65 is initiated, for example by PUSH or PULL modes.

In step (2), an MS Re-authentication process is executed between the new authenticator (i.e the new ASN GW 60) and the HAAA of the MS 10. This re-authentication may include, for example, an EAP (Extensible Authentication Protocol) phase and a PKMv2 3WHS (Privacy and Key Management version 2 3-Way Handshake) phase which represents another phase of the complete authentication process.

Next, in a step (3), in the case the new Authenticator (ASN GW 60) detects a successful completion of the re-authentication process (e.g. a successful completion of PKMv2 3WHS phase), it initiates an R4 Relocation Complete transaction. For this purpose, the new Authenticator (ASN GW 60) informs the old or previous Authenticator (i.e the ASN GW 50) about the successful completion of re-authentication process by sending, for example, a Relocation_Complete_Request message in step (4). Furthermore, the new Authenticator indicates the charging mode supported, for example online charging, by setting an indication such as an "Online Accounting context" bit in the Context Purpose Indicator Type-Length-Value (TLV). In addition, in order to prevent a transmission of quota information from the previous charging client side, a corresponding indication it set, for example, by setting a bit indicating "No Quota Transfer".

Furthermore, in step (5), the charging client functionality (PPC 65) located in the new ASN GW 60 requests new quota information from the charging server (PPS) 30 to start a new prepaid session. For example, the PPC 65 sets up a AAA protocol based session, such as a Diameter session, with the PPS 30 and sends an initial CCR to the PPS 30.

In the meantime, the relocation complete transaction between the new and the previous PPCs may be continued. In step (6), the old Authenticator/PPC (ASN GW 50) responds to the message sent in step (4), for example, with a Relocation_Complete_Response message. This message may provide predetermined information, such as MS context including PPC Context. The new Authenticator/PPC (ASN GW 60) may confirm receipt of the Relocation_Complete_Response message, and receipt of the predetermined information from the previous ASN GW 50, by sending an acknowledgement message, for example a Relocation_Complete_Ack message (step (7). The "old" Authenticator/PPC may now await a prepaid session termination requested by the PPA.

On the other hand, in a step (8), the new charging client (PPC) of the ASN GW 60 receives the quota information from the charging server (PPS) 30 returned in response to the request of step (5). The quota information may be returned, for example by means of a Credit Control Answer (CCA).

According to the present example of the embodiment of the invention, when the Relocation_Complete_Response (step (6)) and/or the predetermined information mentioned above, as well as the quota information (for example by the CCA in step (8)) are received by the ASN GW 60 (the new PPC 65), the new Authenticator/PPC (ASN GW 60) sends an information message to the charging agent (PPA) 70, for example by sending a Context-Report message (step (9)) to initiate an update of the information stored in the PPA regarding the new Authenticator's (ASN GW 60) location/identity. Furthermore, the quota information obtained by the new charging client (ASN GW 60/PPC 65) from the charging server is provided to the PPA 70, either by means of a corresponding information in the Context-Report message (step (9)) or by separate signaling (not shown). This means that the PPA entity will communicate from this moment on with the new PPC 65 with regard to quota updates and the like.

In a step (10), the PPA 70 responds to the Context-Report message of step (9) by means of sending an acknowledgement, such as a Context-Ack message. Furthermore, in step (11), PPA 70 uses the received information (new Authenticator identification information and quota information), i.e. it installs the new quota and closes the old quotas from the old prepaid session with the PPC 55. It is to be noted, as described in connection with FIG. 2, that the old and new quotas may be managed separately in the PPA 70.

In step (12), the PPA 70 initiates the closing of the old prepaid session with the PPC 55. For example, the PPA sends a corresponding termination request, such as a Prepaid Request/PPAQ (Prepaid_Accounting_Quota) message to the previous charging client (PPC 55 in ASN GW 50). In response to this request in step (12), the old PPC initiates a session with the charging server, such as a Diameter related session, for closing the prepaid session to the PPS, for example by sending a terminating CCR (step (13)). In step (14), the PPS 30 confirms the prepaid session closing by sending, for example, a corresponding CCA. Thus, the previous charging client (PPC 55 in ASN GW 50) may close the charging context (prepaid Diameter context) in step (15). Then, the previous charging client may inform the PPA 70 that the old PPC has closed the (old) prepaid session, for example by sending a Prepaid_Notify/PPAQ (Prepaid_Accounting_Quota) message for terminating the session to the charging agent in step (16).

Figure 4:
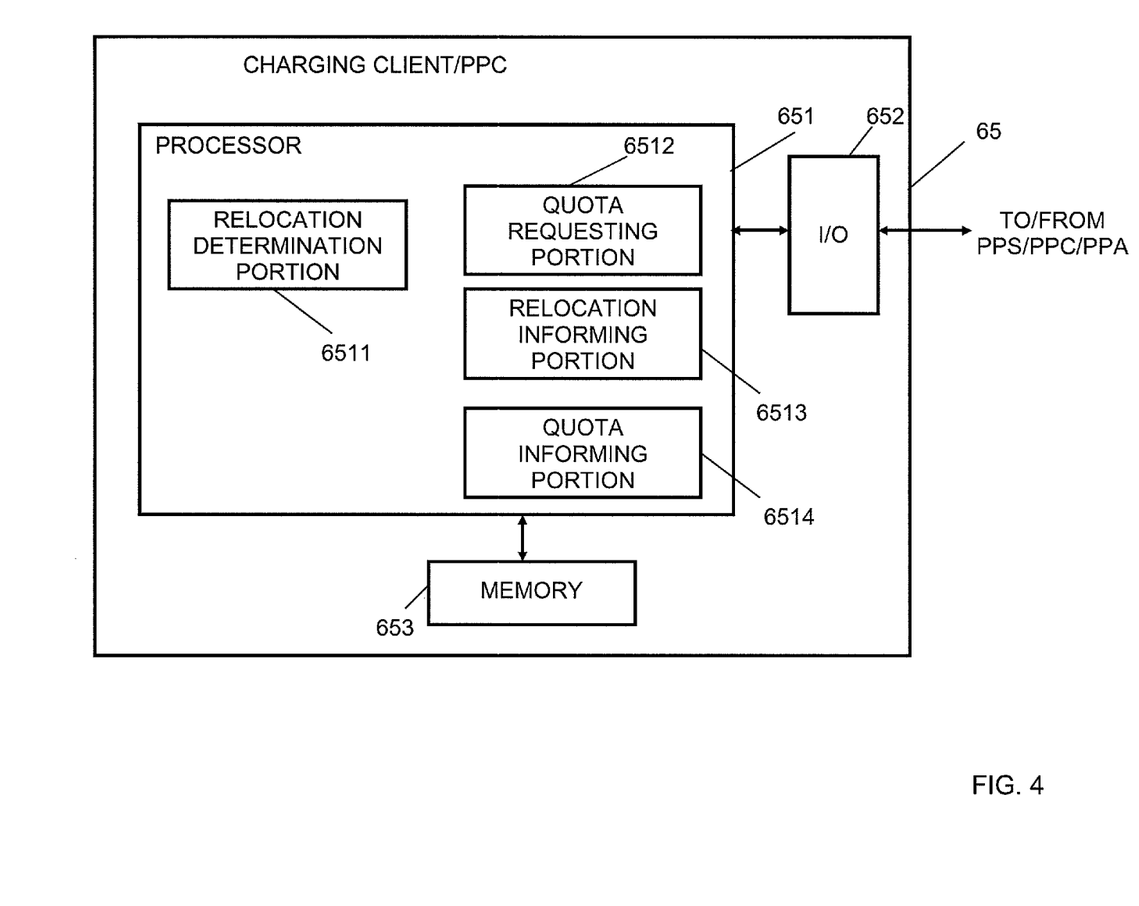
FIG. 4 shows a block circuit diagram illustrating a structure of a charging client element according one example of an embodiment of the invention.
Figure 5:
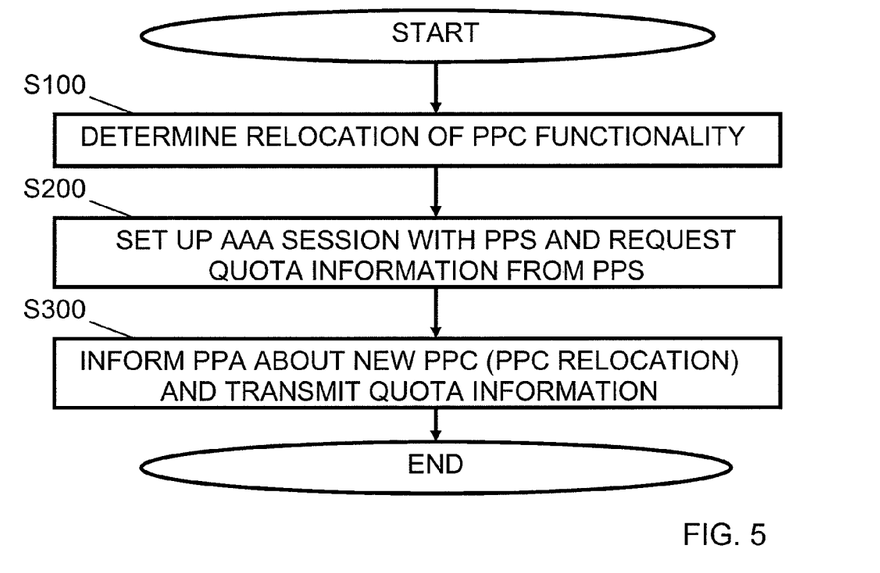
FIG. 5 shows a flow chart of a part of a charging control method executed by the charging client element of FIG. 4 according to one example of an embodiment of the invention.

Next, with regard to FIGS. 4 and 5, functional components and method steps implemented in the charging client entity (i.e. in the PPC 65 of the ASN GW 60, for example) are described. In FIG. 4, a block circuit diagram of a charging client entity 65 is shown which illustrates the parts of the charging client node or entity used for implementing the procedure described in connection with FIG. 2. In FIG. 5, the method steps executed by a corresponding charging client functionality are shown.

It is to be noted that only those parts of the charging client (or ASN GW) 65 are depicted in FIG. 4 which are involved in the charging control mechanism and charging client relocation procedure described above. There may of course be other elements which are used for other functions, which are known to those skilled in the art. These functions may be also executed in part or as a whole by the elements shown in FIG. 4.

In detail, the charging client entity (or PPC) 65 comprises a processor 651 as the main control unit, a transmitter/receiver or input output unit (I/O) 652 connected to the processor 651 for establishing a connection with other elements, such as the charging server (PPS), the charging agent (PPA) or another (old) charging client (PPC), and a memory 653 connected to the processor 651 for storing data and programs executed by the processor 651. In the processor 651, a relocation determining portion 6511, a quota requesting portion 6512, a relocation informing portion 6513 and a quota informing portion 6514 are provided.

The functions of these parts as depicted in FIG. 4 are described in connection with the flow chart according to FIG. 5.

Figure 3:
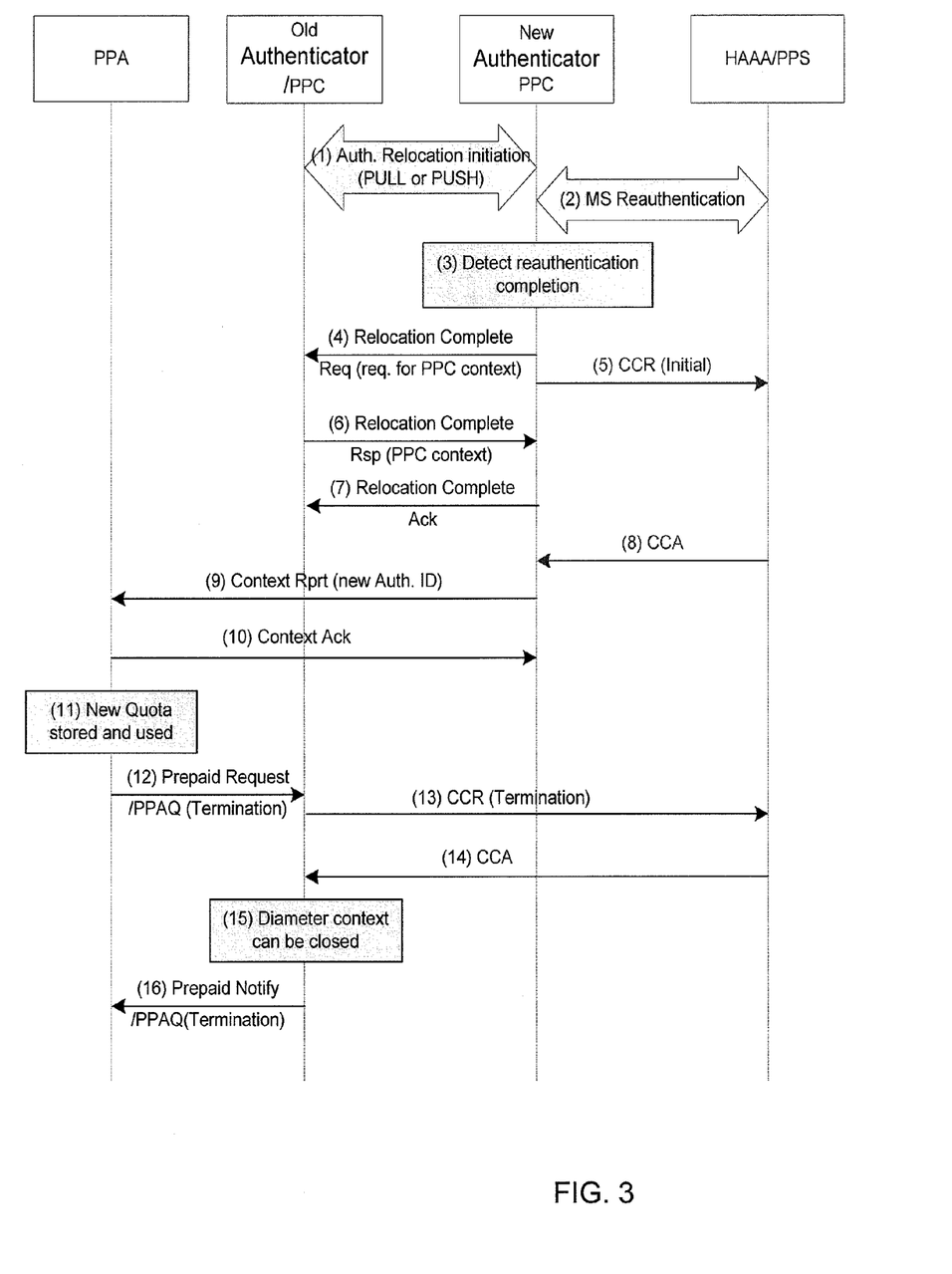
FIG. 3 shows a signaling diagram of a charging control mechanism and a charging client relocation procedure according to one example of an embodiment of the invention.

In a step S100, the relocation of the PPC functionality from the old PPC to the new PPC is determined, for example, by the relocation determination portion 6511 of FIG. 4 (corresponding to step (3) of FIG. 3). Then, in a step S200, the quota information are requested from the PPS by setting up an AAA session between the new PPC and the PPS (corresponding to steps (5) and (8) of FIG. 3), which may be performed by the quota requesting portion 6512. In a step S300, the PPA is informed about the relocation to the new PPC, for example by the relocation informing portion 6513. In addition, the quota information, received due to the function of the quota requesting portion 6512, for example, are also transmitted to the PPA by the quota informing portion 6514. This transmission of the quota information may be executed with the same signaling like that used for informing about the relocation of the charging client functionality.

Figure 6:
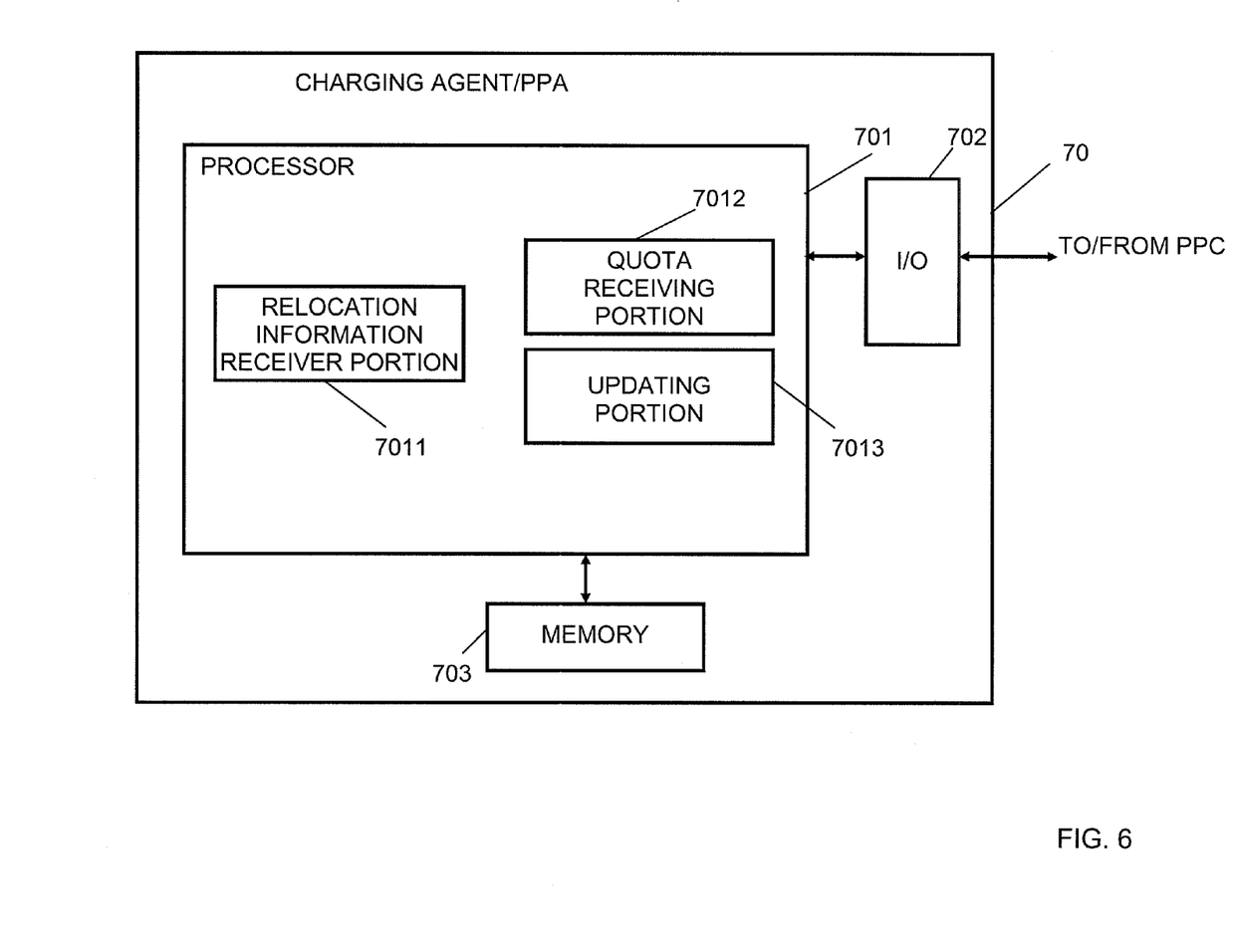
FIG. 6 shows a block circuit diagram illustrating a structure of a charging agent according to one example of an embodiment of the invention.
Figure 7:
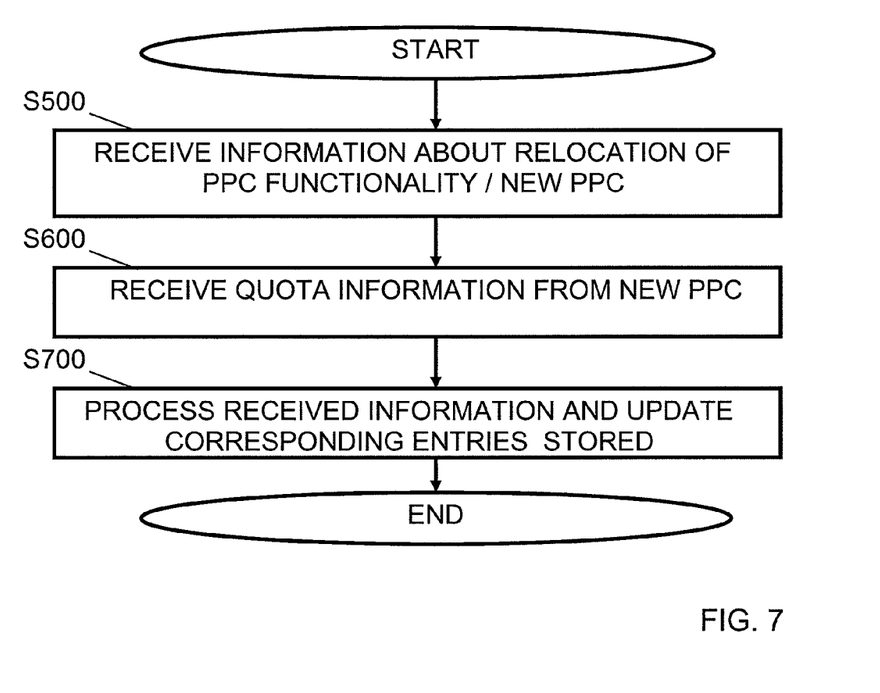
FIG. 7 shows a flow chart of a part of a charging control method executed by the charging agent of FIG. 6 according to one example of an embodiment of the invention.

Next, with regard to FIGS. 6 and 7, functional components and method steps implemented in the charging agent entity (i.e. in the PPA 70, for example) are described. In FIG. 6, a block circuit diagram of a charging agent entity 70 is shown which illustrates the parts of the charging agent 70 used for implementing the procedure described in connection with FIG. 2. In FIG. 7, the method steps executed by a corresponding charging agent are shown.

It is to be noted that only those parts of the charging agent 70 are depicted in FIG. 6 which are involved in the charging control mechanism and charging client relocation procedure described above. There may be of course other elements which are used for other functions, which are known to those skilled in the art. These functions may be also executed in part or as a whole by the elements shown in FIG. 6.

In detail, the charging agent (or PPA) 70 comprises a processor 701 as the main control unit, a transmitter/receiver or input output unit (I/O) 702 connected to the processor 701 for establishing a connection with other elements, such as the old or new charging client (PPC), and a memory 703 connected to the processor 701 for storing data and programs executed by the processor 701, in particular for storing the old and new quota information as shown in FIG. 3, for example. In the processor 701, a relocation information receiver portion 7011, a quota receiving portion 7012 and an updating portion 7013 are provided.

The functions of these parts as depicted in FIG. 6 are described in connection with the flow chart according to FIG. 7.

In a step S500, information regarding the relocation of the PPC functionality from the old PPC to the new PPC is received, for example, by the relocation information receiver portion 7011 of FIG. 6 (corresponding to step (9) of FIG. 3). Furthermore, in a step S600, the quota information is received from the new PPC by the quota receiving portion 7012. Both steps S500 and S600 may be caused by the same message received, i.e. the information related to the relocation of the charging client functionality (such as charging client context data) and the quota information may be sent and received in the same signaling (for example signaling step (9) of FIG. 3). In a step S700, the received information (relocation related information indicating the new PPC identification and the like, as well as the new quota information) are processed resulting in an update of corresponding entries, for example, in the memory 703 regarding the new PPC and quota information by the update portion 7013 (corresponding to step (11) of FIG. 3).

Figure 8:
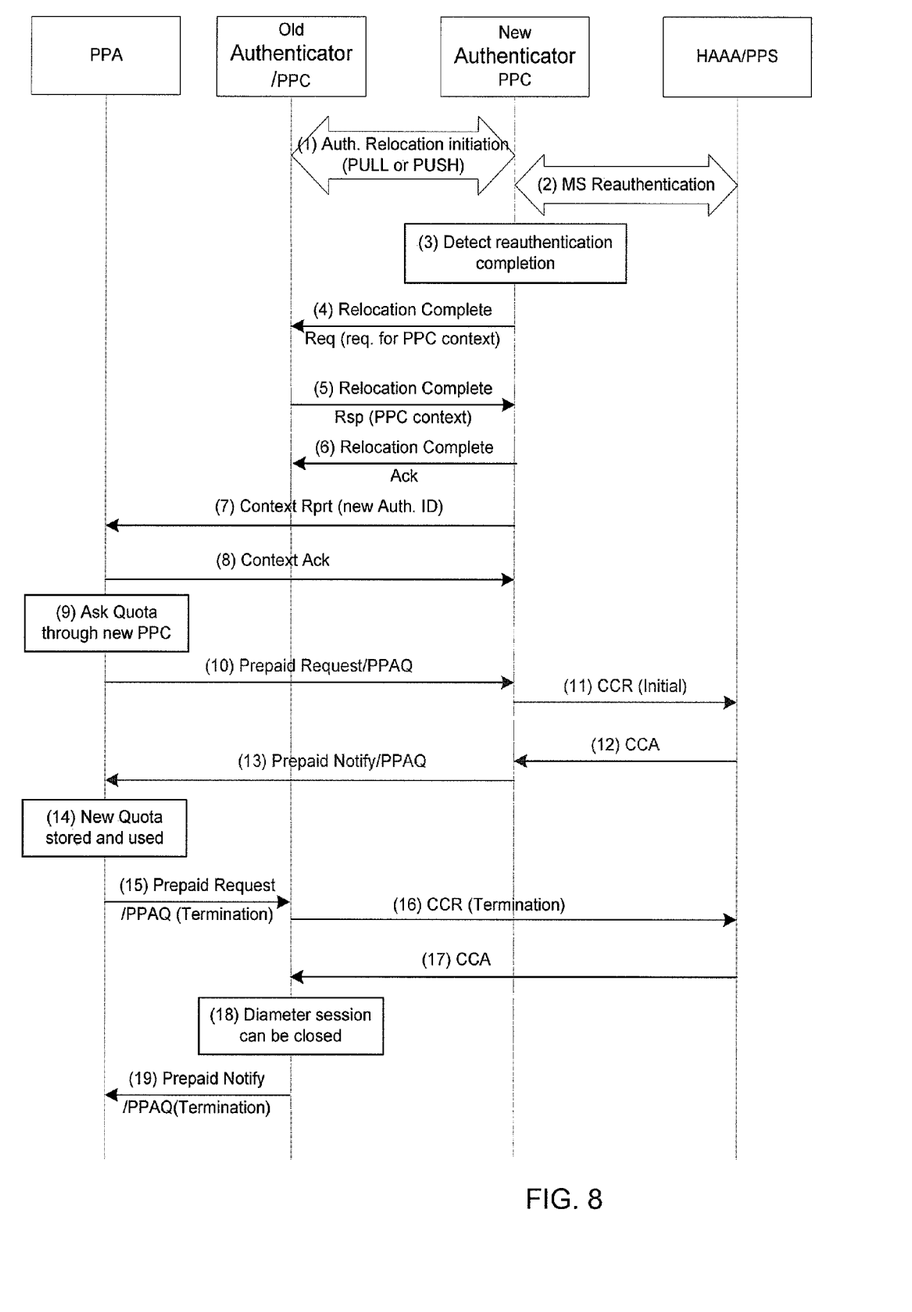
FIG. 8 shows a signaling diagram of a charging control mechanism and a charging client relocation procedure according to a comparative example.

The advantages and effects of the charging control mechanism and the charging client relocation procedure according to the above example of an embodiment of the invention as shown in FIG. 3 will become more apparent when considering a charging control mechanism and a charging client relocation procedure according to an comparative example as shown in FIG. 8. The signaling diagram of FIG. 8 illustrates another approach for a charging control mechanism and a charging client relocation procedure.

The procedure shown in FIG. 8 may be implemented in the same environment as the procedure according to FIG. 3, i.e. for example in the communication network based on FIGS. 1 and 2. Therefore, the elements used in the procedure of FIG. 8 are comparable to that involved in the procedure of FIG. 3 so that a detailed description thereof can be omitted. Furthermore, the procedure according to FIG. 8 comprises several steps which are equivalent to steps executed in the procedure according to FIG. 3. Therefore, in the description of FIG. 8, for the sake of simplicity, only the differences of the respective procedures are described in detail while reference is made to corresponding steps in FIG. 3 when the function thereof is basically the same.

Steps (1) to (3) of FIG. 8 are equivalent to steps (1) to (3) of FIG. 3, i.e. an Authenticator relocation to the new Authenticator/PPC is executed. Then, the new Authenticator/PPC performs an R4 Relocation Complete transaction with the old Authenticator/PPC.

However, in contrast to the example of an embodiment of the invention as shown in FIG. 3, in the comparative example according to FIG. 8, the Relocation Complete transaction between the old and new PPC is completed first. This means that, after the new Authenticator detects a successful completion of the re-authentication process (e.g. a successful completion of PKMv2 3WHS phase), it informs the old or previous Authenticator about the successful completion of re-authentication process by sending, for example, a Relocation_Complete_Request message in step (4) of FIG. 8. The new Authenticator indicates also the charging mode supported, for example online charging, by setting an indication such as an "Online Accounting context" bit in the Context Purpose Indicator Type-Length-Value (TLV).

The relocation complete transaction between the new and the previous PPCs is continued in step (5) of FIG. 8, i.e. the old Authenticator/PPC responds to the message sent in step (4), for example, with a Relocation_Complete_Response message. This message may provide MS context including PPC Context. The new Authenticator/PPC confirms receipt of the Relocation_Complete_Response message by sending an acknowledgement message, for example a Relocation_Complete_Ack message (step (6). The old Authenticator/PPC may now delete the MS context.

Then, the new Authenticator/PPC sends an information message to the charging agent PPA, for example by sending a Context-Report message (step (7) in FIG. 8) to initiate an update of the information stored in the PPA regarding the new Authenticator's (ASN GW 60) location/identity. This means that the PPA entity will communicate from this moment on with the new PPC with regard to quota updates and the like.

In a step (8) of FIG. 8, the PPA responds to the Context-Report message by means of sending an acknowledgement, such as a Context-Ack message.

Now, according to the comparative example, when the new PPC is updated in the PPA, the PPA may start to ask for quota information from the PPS to start the new charging session. A corresponding request for new quota information is sent to the PPS via the new PPC (steps (10) and (11) of FIG. 8). The new PPC starts a new AAA session with the PPS in order to request a new quota, for example by sending a CCR (step (11)). In other words, in the comparative example, the PPA triggers the request for a new quota at the PPS when it is notified about the relocation of the PPC.

In step (12) of FIG. 8, the PPS responds to the request of the new PPC with new quota information, which will be forwarded to the PPA with a Prepaid_Notify/PPAQ message in step (13) of FIG. 8. Then, in step (14), PPA can use the received quota information, i.e. it installs the new quota and closes the old quotas from the old prepaid session with the old PPC 55.

The following steps (15) to (19) of FIG. 8 correspond to steps (12) to (16) of FIG. 3.

Considering the procedure of the comparative example, it becomes apparent that the present invention as described, for example, in connection with the example of an embodiment of the invention according to FIGS. 3 to 7 provides several advantages.

The invention may be used to solve a problem related to a relocation of a charging client functionality in a communication network, such as for example in WiMAX systems where PPC mobility has to be provided for allowing change of access service network elements comprising charging client functions.

According to the comparative example, the charging agent would use existing quota, wherein, after the relocation is notified, i.e. after the change to the new access service network element, new quota is requested from charging server. However, since the mobility procedure requires to set up a new AAA session with the charging server, e.g. a Diameter session, there may be a specific latency time (the communication between the PPA and HAAA/PPS via the PPC is made through a wide area network, and for PPC it might be necessary to setup a new Diameter session first before quota request and return messages). This latency time may exceed the time which the remaining (old) quota lasts, so that a data path would be hotlined.

In other words, according to the comparative example presented in FIG. 8, the PPA continues to use old quotas assigned through old PPC until new quotas are received in step (13). However, since the new PPC is updated and to be used for communication with regard to quotas, as described above, it is not possible to get any further quota from old PPC after step (8) (Context Ack) in FIG. 8, since Authenticator has been relocated from old Authenticator/PPC to new Authenticator/PPC. Hence, there might be the situation that the old quotas available in the charging agent PPA are consumed up before new quotas can be made available in step (13) of FIG. 8. At this time, data plane packets may be dropped.

In contrast to this, according to the example of an embodiment of the invention as described above, when the new authenticator, i.e. the new PPC, determines the relocation to itself, it requests new quota information from the charging server immediately after the re-authentication. Therefore, new quota information can be made available as soon as possible after Authenticator/PPC context is updated with PPA. The new quotas may be preferably transferred to PPA together with Context report (Authenticator/PPC relocation) so that no latency time is caused.

Thus, the proposed solution provides advantages as it speeds up to get quotas as soon as possible from the PPS. Further, the quotas can already be provided with the "Context Report" message and need not to be requested by the PPA separately. This has advantages as it reduces the situations where the Old-Authenticator needs to request new quotas. Furthermore, the invention is applicable in different AAA environments, for example in case AAA is based on RADIUS where online charging will be done based on Diameter protocol.

In the following, a modification of the example of an embodiment of the invention described above is described.

There might be a situation where the charging client relocation procedure according to FIG. 3 may result in that the access network could reserve double the amount of quota. This might be critical for certain situations, for example, when a subscription is close to a prepaid limit and quotas are consumed by several PPCs, for example by an WiMAX access and an IMS voice connection. In such a case the connection might be dropped prematurely.

Therefore, according to a modification of the example of an embodiment of the invention as described in connection with FIGS. 3 to 7, the following amendment to the procedure in FIG. 3 is proposed. If the subscription is close to the prepaid limit, the new PPC 65 might not be able to get quotas from the PPS 30. At this time, the Authenticator/PPC relocation is to be rejected, so that the old PPC will continue to work to make sure that the connection will not be dropped. This can be achieved, for example, by switch the order of step (8) and step (7) in FIG. 3, i.e. to finalize the relocation complete transaction (effected by the signaling in step (7) only when the CCA (with the new quota information) is received from the PPS. In case no quotas are returned from PPS to the new PPC (which may be determined, for example, due to a timer expiration or a corresponding signaling indicating that the PPS does not send any quotas), the new PPC is arranged to reject Authenticator/PPC relocation, so that no Relocation_Complete_Ack (step (7)) is sent. Hence, the old PPC will continue to work. As a result, it may be prevented that the connection is dropped.

Figure 10:
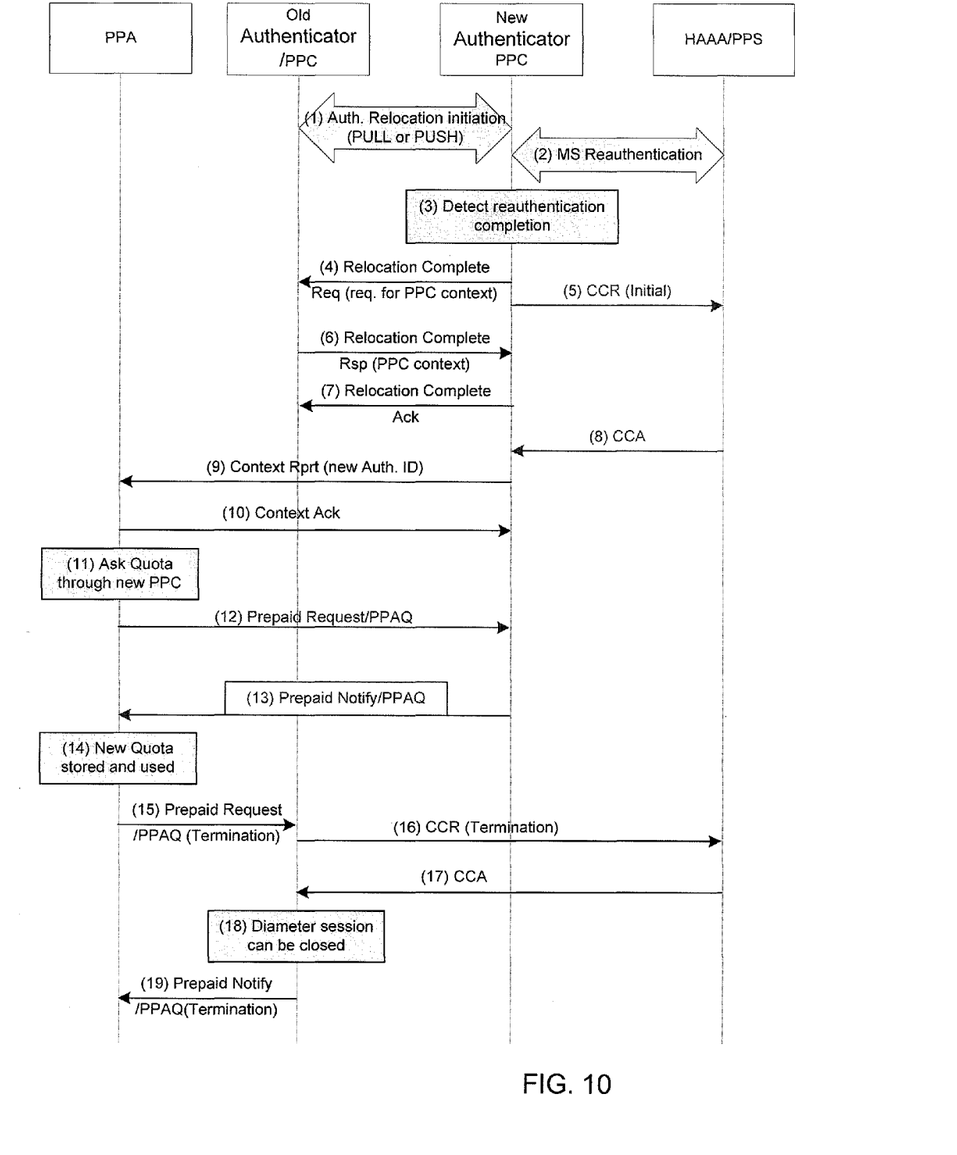

In the following, a further example of an embodiment of the invention is described with regard to FIG. 10. In FIG. 10, a charging control mechanism and a charging client relocation procedure according to the further example of an embodiment of the invention are described.

The procedure shown in FIG. 10 may be implemented in the same environment as the procedure according to FIG. 3, i.e. for example in the communication network based on FIGS. 1 and 2. Therefore, the elements used in the procedure of FIG. 10 are comparable to that involved in the procedure of FIG. 3 so that a detailed description thereof can be omitted. Furthermore, the procedure according to FIG. 10 comprises several steps which are equivalent to steps executed in the procedure according to FIG. 3. Therefore, in the description of FIG. 10, for the sake of simplicity, only the differences of the procedure of the example of an embodiment according to FIG. 3 and the procedure of the further example of an embodiment according to FIG. 10 are described in detail while reference is made to corresponding steps in FIG. 3 when the function thereof is basically the same.

Steps (1) to (3) of FIG. 10 are equivalent to steps (1) to (3) of FIG. 3, i.e. an Authenticator relocation to the new Authenticator/PPC 65 is executed. Then, the new Authenticator/PPC 65 performs an R4 Relocation Complete transaction with the old Authenticator/PPC 55.

The following steps (4) to (8) according to FIG. 10 are also basically equivalent to steps (4) to (8) of the procedure according to FIG. 3. This means, according to the procedure according to FIG. 10, that the new Authenticator (ASN GW 60) informs the old or previous Authenticator (i.e. the ASN GW 50) about the successful completion of re-authentication process by sending, for example, a Relocation_Complete_Request message, wherein the charging mode supported (e.g. online charging) and the indication for preventing a transmission of quota information from the previous charging client side may be indicated. Also, in a step (5), the charging client functionality (PPC 65) located in the new ASN GW 60 requests new quota information from the charging server (PPS) 30 to start a new prepaid session (based, for example, on a AAA protocol based session, such as a Diameter session) and sends an initial CCR to the PPS 30. The relocation complete transaction between the new and the previous PPCs may be continued in steps (6) (sending and receiving, for example, a Relocation_Complete_Response message providing predetermined information, such as MS context including PPC Context) and confirmation thereof by sending an acknowledgement message (for example a Relocation_Complete_Ack message) in step (7). The "old" Authenticator/PPC 55 may now await a prepaid session termination requested by the PPA 70. Then, in a step (8) of FIG. 10, the new charging client (PPC) 65 of the ASN GW 60 receives the quota information from the charging server (PPS) 30 returned in response to the request of step (5), for example by means of a Credit Control Answer (CCA).

According to the further example of the embodiment of the invention, when the Relocation_Complete_Response (step (6)) and/or the predetermined information mentioned above, as well as the quota information (for example by the CCA in step (8)) are received by the ASN GW 60 (the new PPC 65), the new Authenticator/PPC (ASN GW 60) sends an information message to the charging agent (PPA) 70, for example by sending a Context-Report message (step (9)) to initiate an update of the information stored in the PPA regarding the new Authenticator's (ASN GW 60) location/identity. However, according to this further example of the embodiment of the invention according to FIG. 10, the quota information obtained by the new charging client (ASN GW 60/PPC 65) from the charging server is not yet provided to the PPA 70. In other words, a corresponding information will be sent by a separate signaling (described later).

As a result of step (9), the PPA entity will communicate from this moment on with the new PPC 65 with regard to quota updates and the like.

In a step (10), the PPA 70 responds to the Context-Report message of step (9) by means of sending an acknowledgement, such as a Context-Ack message.

Then, in a step (11) of FIG. 10, when the new PPC 65 is updated in the PPA 70, the PPA 70 may start to ask for quota information to start the new charging session. A corresponding request for new quota information is sent to the new PPC, for example by means of a Prepaid Request/PPAQ message. Since the new PPC 65 has already received the charging information (prepaid information, quota information) from the PPS 30 in step (8), it can respond to the request of step (12) directly in step (13) by sending new quota information, which may be forwarded to the PPA 70, for example, with a Prepaid_Notify/PPAQ message in step (13).

Then, in step (14), PPA 70 uses the received information, i.e. it installs the new quota and closes the old quotas from the old prepaid session with the PPC 55. It is to be noted, as described in connection with FIG. 2, that the old and new quotas may be managed separately in the PPA 70.

The following steps (15) to (19) of the procedure according to FIG. 10 may be equivalent to the steps (12) to (16) according to FIG. 3 so that a description thereof is omitted here.

According to the further example of an embodiment of the invention, it is also possible to improve the performance of the relocation procedure since the quota information for the new charging client (PPC 65) are available for the charging agent in a short time as no new AAA protocol based session with the charging server is to be established first. Normally, a communication time between charging agent (PPA) and charging client (PPC) is short and in particular faster than a further establishment of a new session with the PPS. Thus, the problem that the old quotas are consumed to a threshold can be also avoided by the further example of an embodiment according to FIG. 10.

It is to be noted that the measures described in connection with FIGS. 3 and 10 regarding the charging control mechanism and the procedure to obtain quota information at the charging agent are in particular applicable in the initial phase after the relocation of the charging client functionality, i.e. for obtaining a first group of quotas after relocation. For obtaining following quota information during the lifetime of the communication connection or session, another procedure may be applicable, for example based on the measures according to steps (12) and (13) according to FIG. 10.

For the purpose of the present invention as described herein above, it should be noted that an access technology may be any technology by means of which a user equipment can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, an access network may be any device, apparatus, unit or means by which a station, entity or other user equipment may connect to and/or utilize services offered by the access network; such services include, among others, data and/or (audio-) visual communication, data download etc.;

a mobile station (or user equipment) may be any device, apparatus, unit or means by which a system user may experience services from an access network such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is proposed a mechanism for charging control and a charging client relocation. When it is determined that a relocation of a charging related functionality for a communication connection from a previous charging client node to a new charging client node is executed, the new charging client node requests quota information used in a charging procedure for the communication connection from a charging server node. A charging agent is informed by the new charging client node about the relocation to the new charging client node after predetermined information is received from the previous charging client node and the quota information is received from the charging server.

Although the present invention has been described herein before with reference to particular embodiments thereof, the present invention is not limited thereto and various modifications can be made thereto.

The invention claimed is:

1. A method, comprising:
determining that a relocation procedure of a charging related functionality for a communication connection from a previous charging client node to a new charging client node is executed,
requesting by the new charging client node from a charging server node, before the relocation procedure to the new charging client node is completed, quota information used in a charging procedure for the communication connection, and
sending by the new charging client node an information to a charging agent about the relocation to the new charging client node after the relocation procedure is completed for the new charging client node, after predetermined information is received from the previous charging client node, and after the quota information is received by the new charging client node from the charging server node.

2. The method according to claim 1, wherein
the predetermined information from the previous charging client node comprises at least one of mobile station context data and charging client context data.

3. The method according to claim 1, further comprising:
transmitting an acknowledgment message for a receipt of the predetermined information to the previous charging client node directly after receipt thereof or after receipt of the quota information.

4. The method according to claim 1, further comprising:
rejecting the relocation to the new charging client node in case no quota information is received.

5. The method according to claim 1, further comprising:
transmitting a relocation complete indication message to the previous charging client node, wherein the relocation complete indication message comprises at least one of an information indicating a support of a specific charging mode and an information indicating an inhibition of a quota information transmission from the previous charging client node side.

6. The method according to claim 1, wherein the sending further comprises sending of data for updating charging client context data in the charging agent.

7. The method according to claim 1, wherein the requesting further comprises setting up of a session with the charging server node on the basis of an authentication-authorization-accounting protocol.

8. The method according to claim 1, wherein the sending further comprises transmitting of quota information to the charging agent based on the quota information received.

9. The method according to claim 1, further comprising transmitting quota information to the charging agent based on the quota information received.

10. A computer program product comprising code means configured to, when run on a computer system, control the computer system to perform the method of claim 1.

11. An apparatus, comprising:

determining means for determining that a relocation procedure of a charging related functionality for a communication connection from a previous charging client node to a new charging client node is executed, requesting means for requesting from a charging server node, before the relocation procedure to the new charging client node is completed, quota information used in a charging procedure for the communication connection, for the new charging client node, receiving means for receiving the quota information from the charging server node, and informing means for sending an information to a charging agent about the relocation to the new charging client node after the relocation procedure is completed for the new charging client node, after predetermined information is received from the previous charging client node, and after the quota information is received by the receiving means.

* * * * *